United States Patent
Yao et al.

(10) Patent No.: US 11,887,387 B2
(45) Date of Patent: Jan. 30, 2024

(54) MESH STRUCTURE EQUIPMENT DETECTION APPARATUS, MESH STRUCTURE EQUIPMENT DETECTION METHOD AND PROGRAM

(71) Applicant: NIPPON TELEGRAPH AND TELEPHONE CORPORATION, Tokyo (JP)

(72) Inventors: Yasuhiro Yao, Musashino (JP); Hitoshi Niigaki, Musashino (JP); Kana Kurata, Musashino (JP); Shingo Ando, Musashino (JP); Atsushi Sagata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 132 days.

(21) Appl. No.: 17/627,883

(22) PCT Filed: Jul. 23, 2019

(86) PCT No.: PCT/JP2019/028809
§ 371 (c)(1),
(2) Date: Jan. 18, 2022

(87) PCT Pub. No.: WO2021/014557
PCT Pub. Date: Jan. 28, 2021

(65) Prior Publication Data
US 2022/0254173 A1    Aug. 11, 2022

(51) Int. Cl.
*G06V 20/64* (2022.01)
*G06T 7/60* (2017.01)
(Continued)

(52) U.S. Cl.
CPC ............. *G06V 20/64* (2022.01); *G06T 7/60* (2013.01); *G06V 10/46* (2022.01); *G06V 10/762* (2022.01);
(Continued)

(58) Field of Classification Search
CPC ..... G06T 15/005; G06T 11/001; G06T 11/40; G06T 11/60; G06T 19/00; G06T 17/20; G06T 17/00; G06T 15/10; G06T 15/00
See application file for complete search history.

(56) References Cited

U.S. PATENT DOCUMENTS

| 2016/0012309 A1 | 1/2016 | Manabe et al. |
| 2019/0311546 A1* | 10/2019 | Tay ...................... G05D 1/0088 |
| 2022/0254173 A1* | 8/2022 | Yao ........................ G06V 10/46 |

FOREIGN PATENT DOCUMENTS

| JP | 2002-174510 | 6/2002 |
| JP | 2003-148916 | 5/2003 |

(Continued)

OTHER PUBLICATIONS

Martin A. Fischler and Robert C. Bolles., "Random Sample Consensus: A Paradigm for Model Fitting with Applications to Image Analysis and Automated Cartography", pp. 381-395, vol. 24, No. 6, 1981, Communications of the ACM.

*Primary Examiner* — Todd Buttram
(74) *Attorney, Agent, or Firm* — IPUSA, PLLC

(57) ABSTRACT

A mesh structure facility detection device detects data corresponding to a mesh structure facility from three-dimensional structure data representing a space including an outer shape of an object, and projects the three-dimensional structure data in a predetermined direction to obtain two-dimensional structure data; and detects a point included in a region in which the two-dimensional structure data has a density of (Continued)

more than or equal to a predetermined threshold value as a point corresponding to the mesh structure facility.

8 Claims, 12 Drawing Sheets

(51) Int. Cl.
*G06V 10/46* (2022.01)
*G06V 10/762* (2022.01)
*G06V 10/764* (2022.01)

(52) U.S. Cl.
CPC .. G06V 10/764 (2022.01); *G06T 2207/10028* (2013.01)

(56) References Cited

FOREIGN PATENT DOCUMENTS

| | | | | |
|---|---|---|---|---|
| JP | 2005-530138 | 10/2005 | | |
| JP | 2006-345695 | 12/2006 | | |
| JP | 2014-109555 | 6/2014 | | |
| JP | 2015-078849 | 4/2015 | | |
| JP | 2016-021091 | 2/2016 | | |
| JP | 2019-003527 | 1/2019 | | |
| WO | WO-2021014557 A1 * | 1/2021 | ............... | G06T 7/60 |

* cited by examiner

POINTS INDICATED BY ✖ ARE PLANAR COORDINATES OF COLUMN INSTALLED POSITIONS

MESH STRUCTURE EQUIPMENT DETECTION APPARATUS, MESH STRUCTURE EQUIPMENT DETECTION METHOD AND PROGRAM

TECHNICAL FIELD

The present invention relates to a technology for detecting a set of points related to vertical poles which are mesh structure facilities from a three-dimensional point cloud.

BACKGROUND ART

Examples of a technology for detecting a set of points related to vertical poles from a three-dimensional point cloud include a technology disclosed in Patent Literature 1. In the technology disclosed in Patent Literature 1, each point is provided with a label representing a class of an object (in a case of targeting at a point cloud in an urban area, for example, there are classes such as a building, a telecommunication pole, and an overhead wire) using a classifier learned through machine learning.

With the technique as described above, a column model is fitted to a point cloud labeled a telecommunication pole, for example, in a point cloud provided with estimated labels by a model fitting technique through use of inlier number maximization (see Non-Patent Literature 1) represented by Random sample consensus (RANSAC), so that the telecommunication pole can be extracted as a column model. Patent Literature 2 discloses a technology for carrying out column fitting through use of RANSAC.

CITATION LIST

Patent Literature

Patent Literature 1: Japanese Patent Laid-Open No. 2019-3527
Patent Literature 2: Japanese Patent Laid-Open No. 2014-109555

Non-Patent Literature

Non-Patent Literature 1: Martin A. Fischler & Robert C. Bolles (June 1981). "Random Sample Consensus: A Paradigm for Model Fitting with Applications to Image Analysis and Automated Cartography". Comm. ACM. 24 (6): 381-395. doi:10.1145/358669.358692

SUMMARY OF THE INVENTION

Technical Problem

With the conventional technology for carrying out column fitting through use of RANSAC, column fitting may fail in a case where a targeted vertical pole does not have a shape easily expressed as a geometric model such as a column or cuboid, or in a case where the surface shape has not been obtained correctly because of significant measurement noise.

The present invention has an object to provide a technology for enabling even a mesh structure facility not having a shape easily expressed as a geometric model or a mesh structure facility whose surface shape has not been obtained correctly because of significant measurement noise to be detected from a three-dimensional point cloud.

Means for Solving the Problem

According to the disclosed technology, a mesh structure facility detection device that detects data corresponding to a mesh structure facility from three-dimensional structure data representing a space including an outer shape of an object is provided. The mesh structure facility detection device includes: a projection unit that projects the three-dimensional structure data in a predetermined direction to obtain two-dimensional structure data; and a detection unit that detects a point included in a region in which the two-dimensional structure data has a density of more than or equal to a predetermined threshold value as a point corresponding to the mesh structure facility.

Effects of the Invention

According to the disclosed technology, a technology for enabling even a mesh structure facility not having a shape easily expressed as a geometric model or a mesh structure facility whose surface shape has not been obtained correctly because of significant measurement noise to be detected from a three-dimensional point cloud is provided.

DESCRIPTION OF EMBODIMENTS

Hereinafter, an embodiment of the present invention (the present embodiment) will be described with reference to the drawings. The embodiment which will be described below is merely an example, and the embodiment to which the present invention is applied is not limited to the following embodiment.

In the following description, the coordinate system is the three-dimensional orthogonal coordinate system, and particularly, a coordinate system in which the xy plane is a horizontal plane and the z-coordinate represents the height.

Examples thereof include the planar orthogonal coordinate system and the like. However, the use of the three-dimensional orthogonal coordinate system as the coordinate system is an example, and a coordinate system other than the three-dimensional orthogonal coordinate system may be used.

In addition, a three-dimensional point cloud of an object to be a target of detection in the present embodiment is data representing an appearance (surface) of the object. In addition, the object is a mesh structure facility. The present invention is intended for a point provided with a label corresponding to a desired facility among labels provided by arbitrary means. The accuracy of label estimation is far from high depending on selected arbitrary means, and noise (which is a point estimated as a label corresponding to a desired facility, but does not correspond to the desired facility in reality) may be included. When assuming such a case, for example, the density of points provided with a label corresponding to a predetermined facility in a predetermined region may be high if it is not noise; and may be low if it is not noise. The present invention removes noise in this manner, and extracts a point corresponding to a desired facility with high accuracy.

(Device Configuration)

Figure 1:
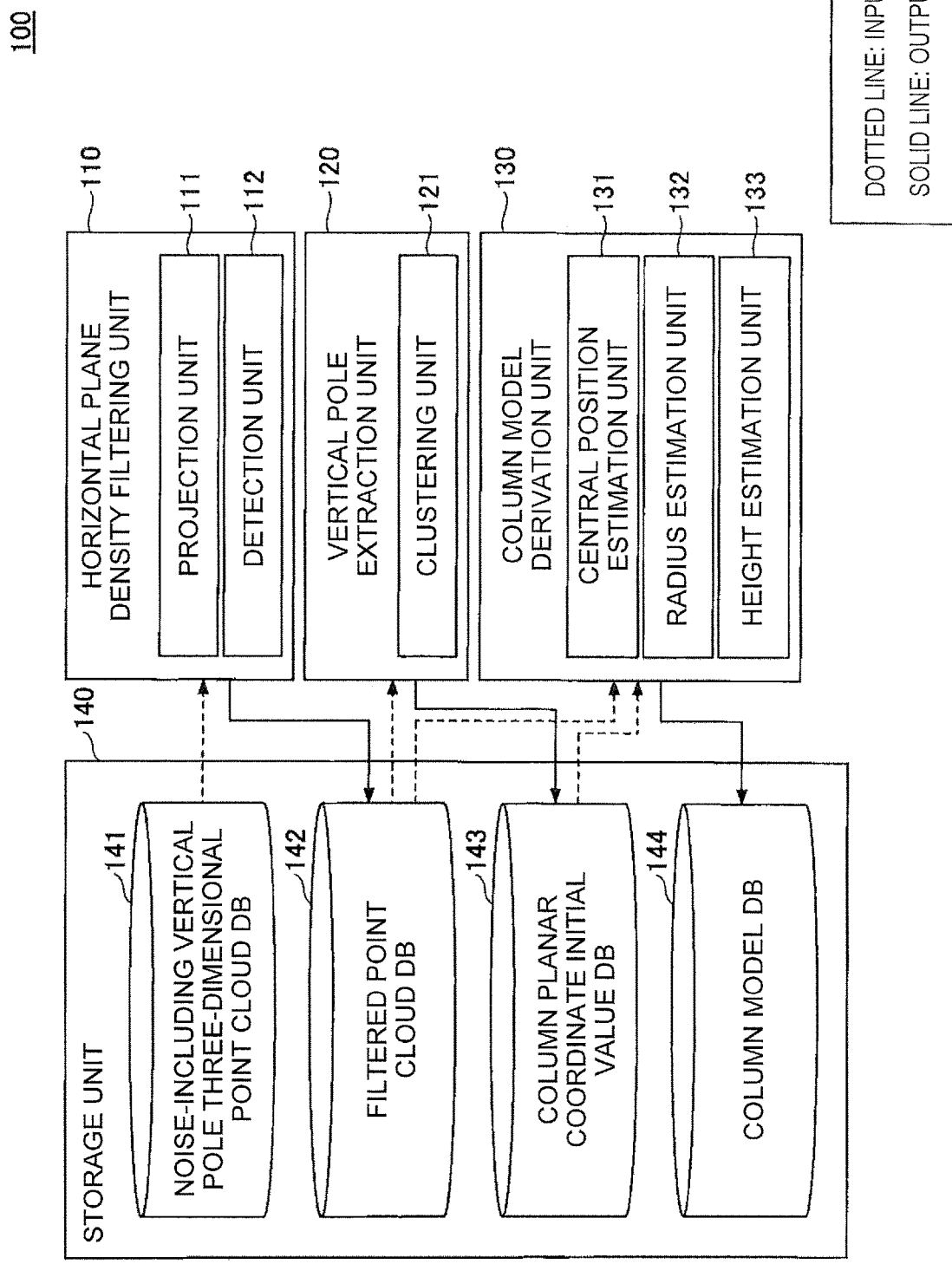
FIG. 1 is a drawing illustrating a configuration example of a vertical pole modeling device according to an embodiment of the present invention.

FIG. 1 is a drawing illustrating a functional configuration example of a vertical pole modeling device 100 according to an embodiment of the present invention. As illustrated in FIG. 1, the vertical pole modeling device 100 according to an embodiment of the present invention has a horizontal plane density filtering unit 110, a vertical pole extraction unit 120, a column model derivation unit 130, and a storage unit 140. Note that the storage unit 140 may be a database server provided outside the vertical pole modeling device 100 and connected to the vertical pole modeling device 100 over a network.

The horizontal plane density filtering unit 110 includes a projection unit 111 and a detection unit 112. The vertical pole extraction unit 120 includes a clustering unit 121. The column model derivation unit 130 includes a central position estimation unit 131, a radius estimation unit 132, and a height estimation unit 133. The storage unit 140 includes a noise-including vertical pole three-dimensional point cloud DB (database) 141, a filtered point cloud DB 142, a column planar coordinate initial value DB 143, and a column model DB 144. An operation of each unit will be described later.

Note that the vertical pole modeling device 100 may further include an input unit for inputting various types of data, and an output unit that outputs a calculation result to the outside of the device. In addition, each of the horizontal plane density filtering unit 110, the vertical pole extraction unit 120, the column model derivation unit 130 may be configured to include an output unit to output (for example, display) each calculation result to the outside.

In addition, since the vertical pole modeling device 100 is a device that detects a mesh structure facility such as a truss structure, this may be called a mesh structure facility detection device.

The vertical pole modeling device 100 can be implemented by causing a computer to execute a program, for example. The same applies to the vertical pole modeling device 100 according to a variation which will be described later.

That is, the vertical pole modeling device 100 can be implemented by executing a program corresponding to processing carried out in the vertical pole modeling device 100 using hardware resources such as a CPU and a memory built in a computer.

The above-described program can be recorded on a computer-readable recording medium (such as a portable memory) for storage and distribution. Alternatively, the above-described program may be provided over a network such as the Internet or e-mail.

Figure 2:
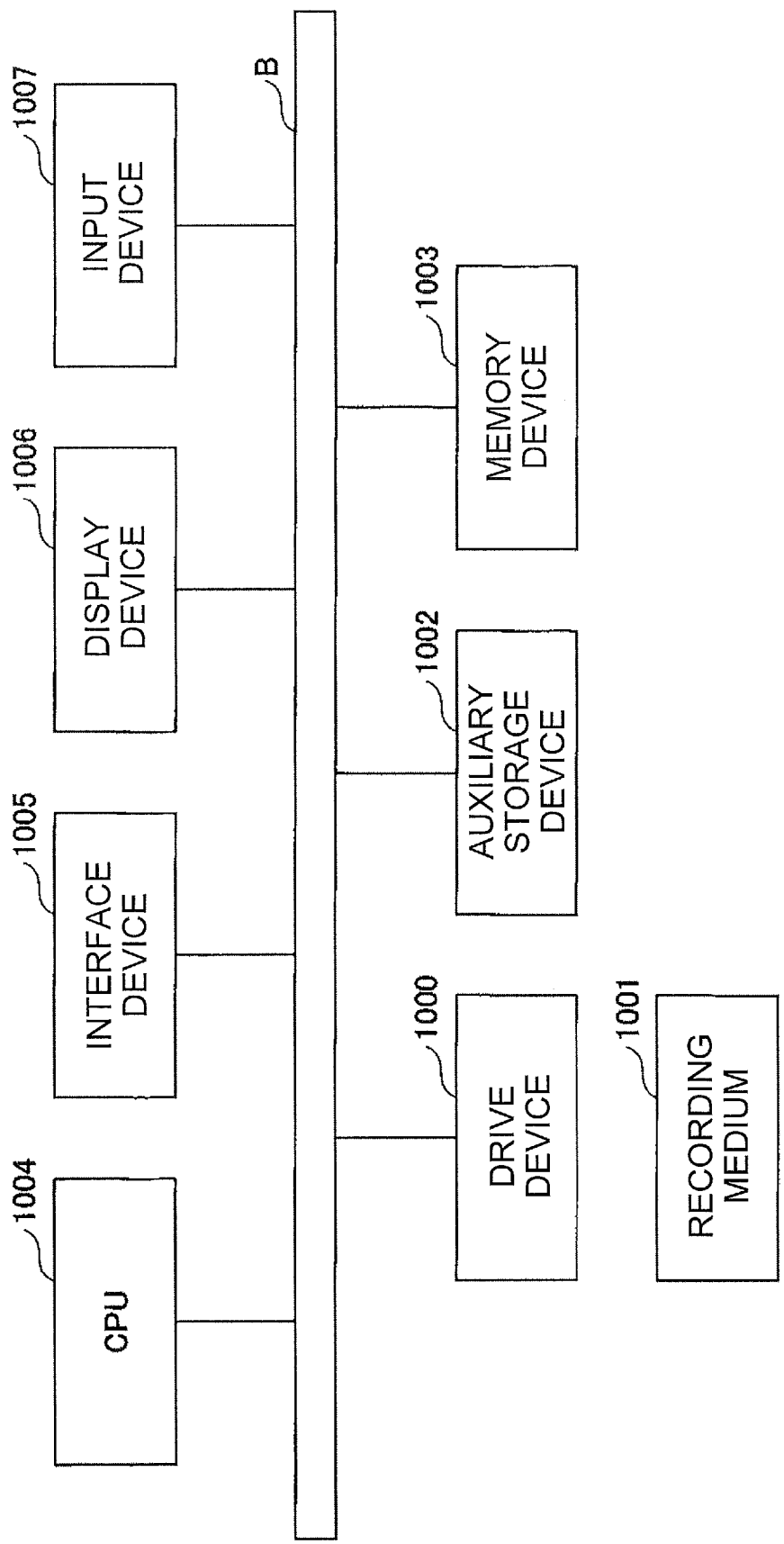
FIG. 2 is a drawing illustrating a hardware configuration example of the vertical pole modeling device.

FIG. 2 is a drawing illustrating a hardware configuration example of the above-described computer. The computer of FIG. 2 has a drive device 1000, an auxiliary storage device 1002, a memory device 1003, a CPU 1004, an interface device 1005, a display device 1006, an input device 1007, and the like, each being connected to each other with a bus B.

The program that implements processing in the computer is provided by a recording medium 1001 such as a CD-ROM or memory card, for example. When the recording medium 1001 storing the program is set in the drive device 1000, the program is installed into the auxiliary storage device 1002 from the recording medium 1001 via the drive device 1000. However, it is not necessarily required to install the program from the recording medium 1001, but may be downloaded from another computer through a network. The auxiliary storage device 1002 stores the installed program, and also stores necessary files, data, and the like.

The memory device 1003 reads out and stores the program from the auxiliary storage device 1002 in a case where a program running instruction is received. The CPU 1004 implements functions related to the vertical pole modeling device 100 in accordance with the program stored in the memory device 1003. The interface device 1005 is used as an interface for connection to a network, and functions as input means and output means through the network. The display device 1006 displays a GUI (Graphical User Interface) and the like in accordance with the program. The input device 1007 is composed of a keyboard and mouse, buttons, a touch panel, or the like, and is used for input of various operation instructions.

(Overall Operation of Vertical Pole Modeling Device 100)

Figure 3:
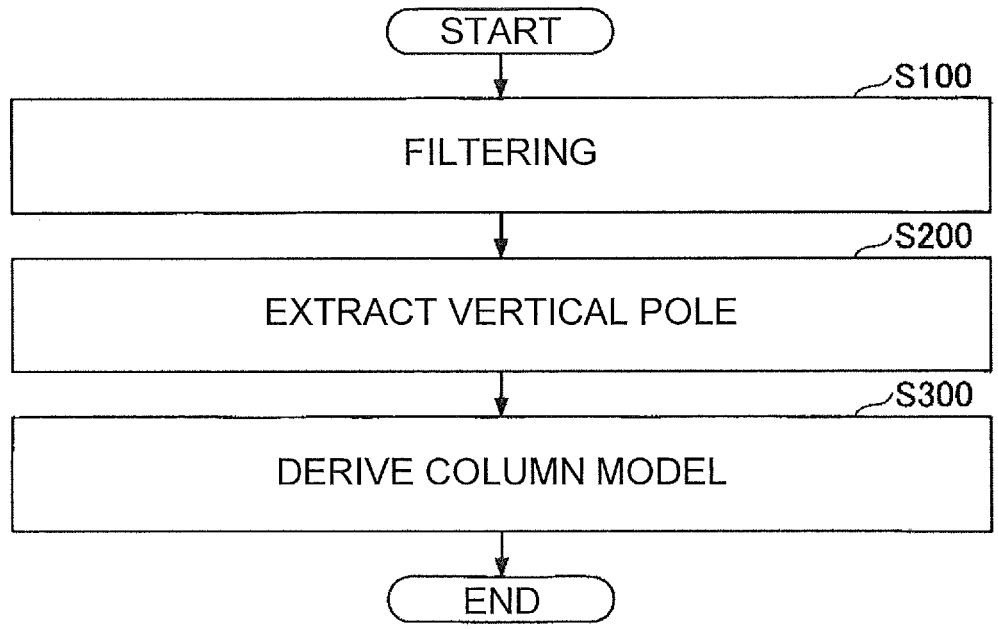
FIG. 3 is a drawing illustrating an overall process flow of the vertical pole modeling device.

FIG. 3 is a process flow illustrating an overall operation of the vertical pole modeling device 100. In S100 (Step 100), the horizontal plane density filtering unit 110 carries out filtering on a noise-including target three-dimensional point cloud read out from the noise-including vertical pole three-dimensional point cloud 141 through threshold processing based on a density of a point cloud projected on the horizontal plane to calculate a filtered point cloud, and outputs the filtered point cloud to the filtered point cloud DB 142. In the present embodiment, the three-dimensional point cloud to be an input includes a plurality of target columnar objects and noise caused by erroneous detection.

In S200, the vertical pole extraction unit 120 reads out the filtered point cloud calculated in S100 from the filtered point cloud DB 142 as an input, extracts a vertical pole by means of the greedy approximation algorithm that solves the k-Center method in an approximated manner, and outputs a column planar coordinate initial value to the column planar coordinate initial value DB 143.

In S300, the column model derivation unit 130 reads out the filtered point cloud and the column planar coordinate initial value from the filtered point cloud DB 142 and the column planar coordinate initial value DB 143, respectively, as inputs, and calculates a column model including column installed coordinates, column radius, and column height through an optimization calculation for output to the column model DB 144.

Hereinafter, an operation of each unit constituting the vertical pole modeling device 100 will be described in more detail. Note that although a steel pole is illustrated as an example of a vertical pole in drawings illustrated as a specific example in the following description, this is merely an example of a mesh structure facility, and the scope of application of the present invention is not limited to a steel pole. In addition, schematic diagrams of three-dimensional models are illustrated in the drawings instead of a point cloud.

(Operation of Horizontal Plane Density Filtering Unit 110)

First, an operation of the horizontal plane density filtering unit 110 will be described in line with a process flow of FIG. 4.

<S101>

Figure 5:
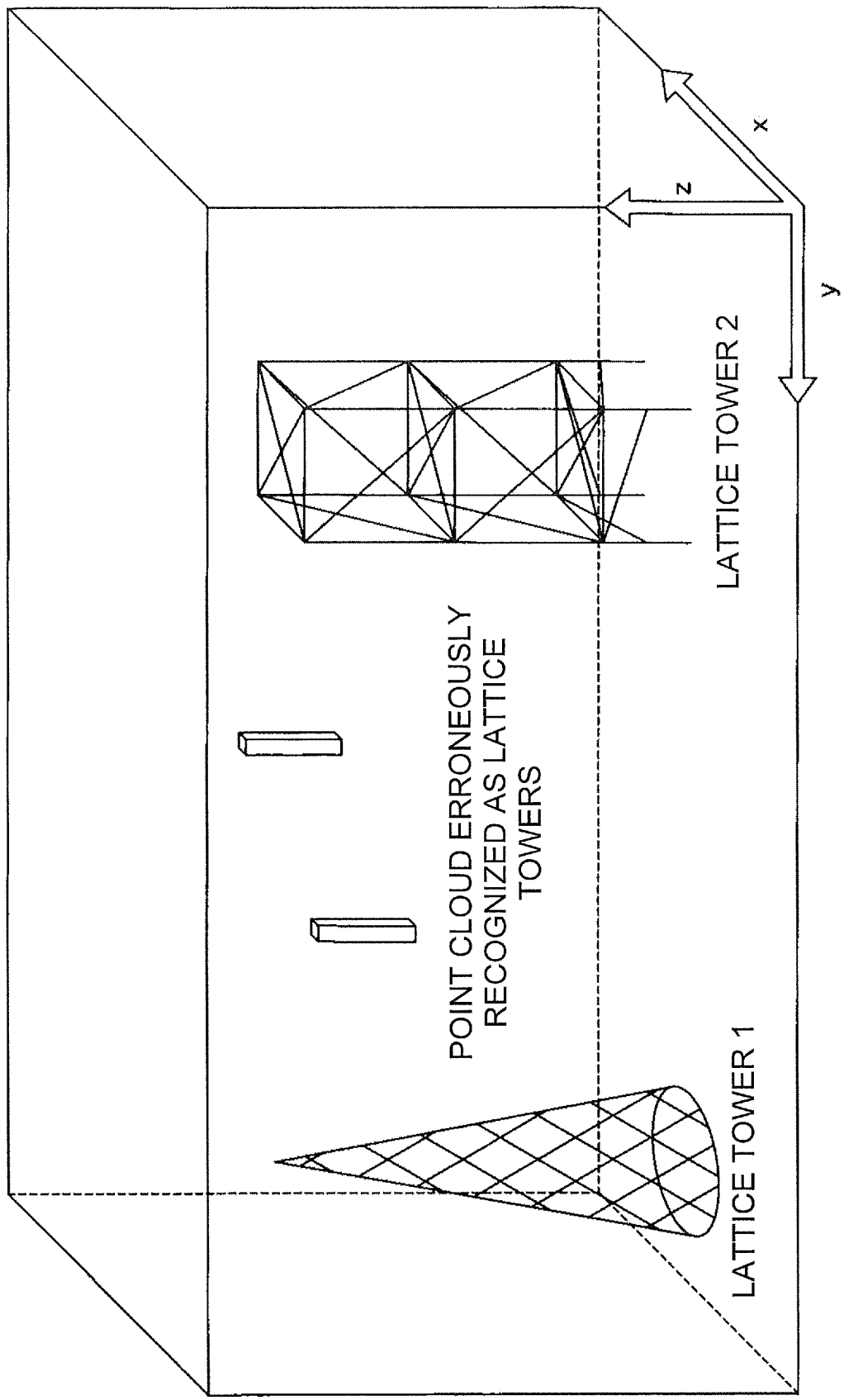
FIG. 5 is a drawing illustrating an example of an input three-dimensional point cloud.

In S101, the horizontal plane density filtering unit 110 reads out a noise-including target three-dimensional point cloud from the noise-including vertical pole three-dimensional point cloud 141 as an input. FIG. 5 illustrates an example of an input three-dimensional point cloud.

<S102>

Figure 4:
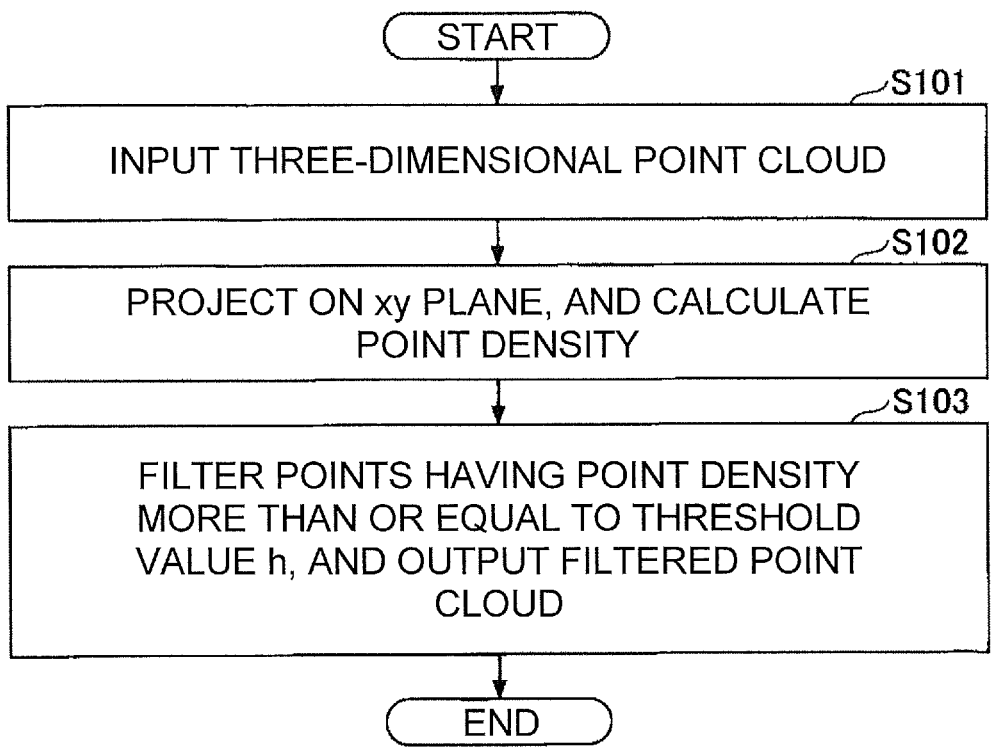
FIG. 4 is a drawing illustrating a process flow of a horizontal plane density filtering unit.
Figure 6:
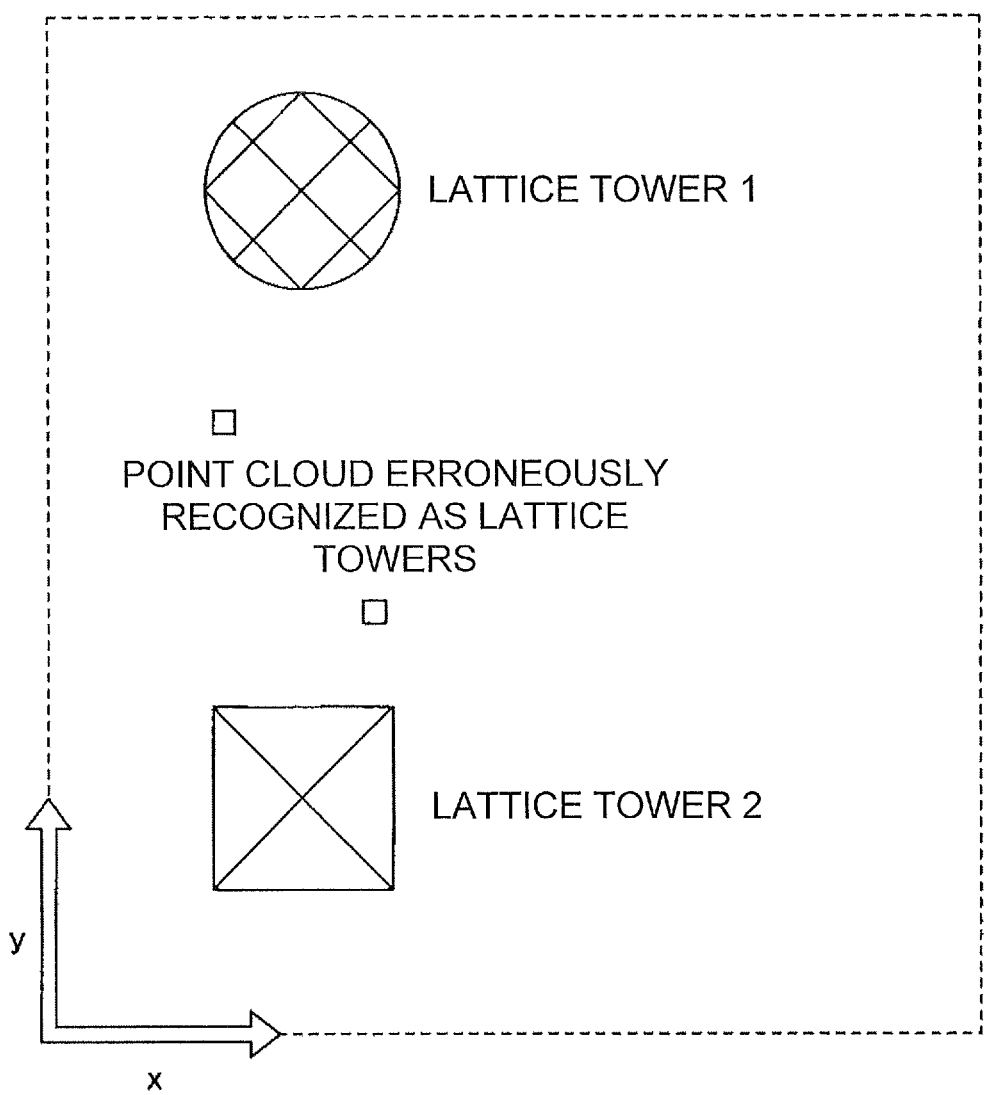
FIG. 6 is a drawing in which the example of the input three-dimensional point cloud is projected on a horizontal plane.

In S102 of FIG. 4, the projection unit 111 of the horizontal plane density filtering unit 110 projects the noise-including vertical pole three-dimensional point cloud on the xy plane, and calculates a point density on the xy plane at each position. FIG. 6 illustrates an example of projecting the three-dimensional point cloud illustrated in FIG. 5 on the xy plane. Note that in S101, a three-dimensional point cloud not including noise (that is, only points estimated as vertical poles) may be used as an input, and the three-dimensional point cloud may be projected on the xy plane to execute subsequent processing.

The method of calculating the density is not limited to a specific method, and includes a method of dividing the xy plane into two-dimensional grids, counting the number of points included in each grid, and dividing the number by the area, for example, a method of counting the number of points present within a certain radius from each point projected on the xy plane and dividing the number by the area of the circle, for example, and the like.

<S103>

Figure 7:
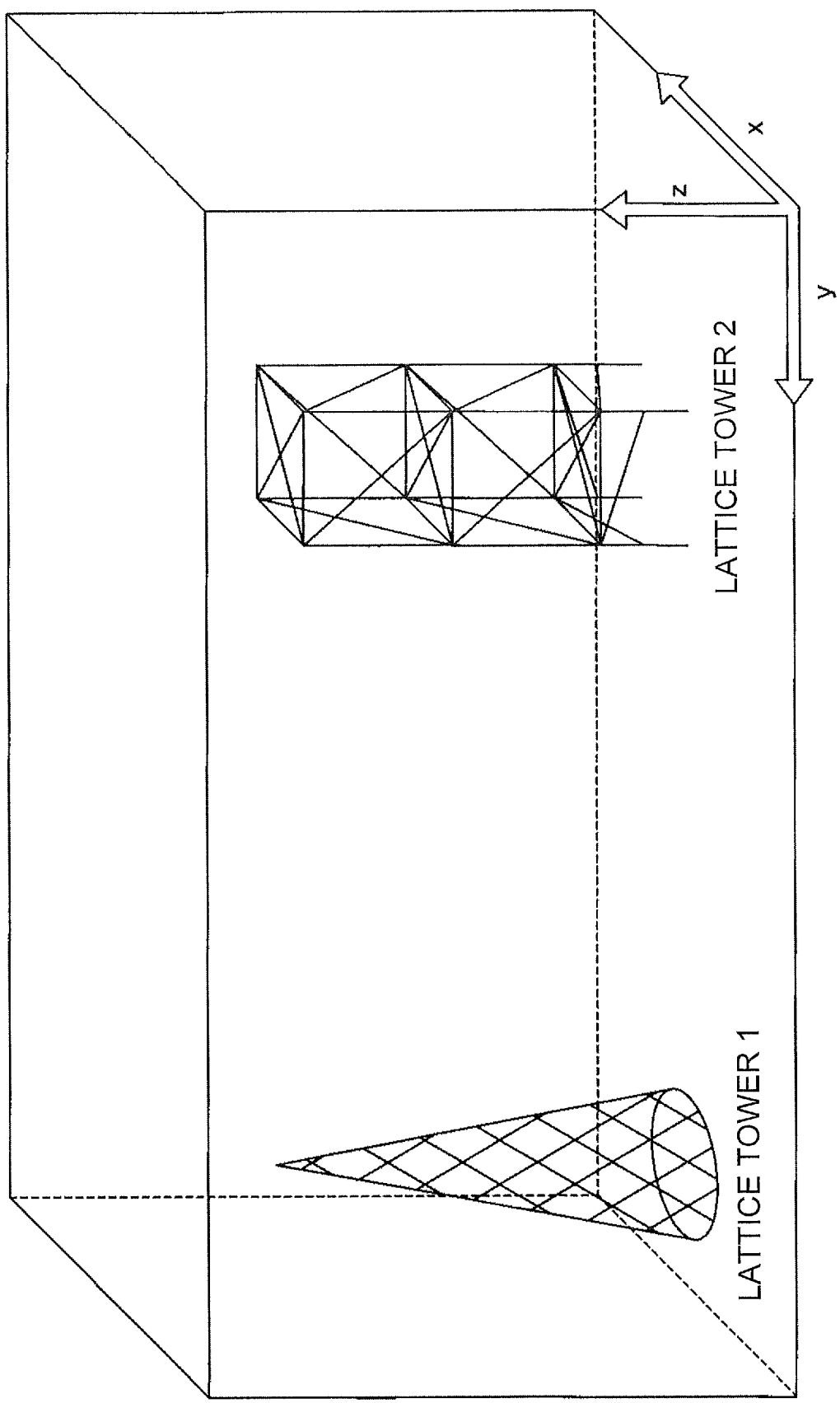
FIG. 7 is a drawing illustrating an example of a filtered three-dimensional point cloud.

In S103 of FIG. 4, the detection unit 112 of the horizontal plane density filtering unit 110 leaves only positions (regions) where the point density on the xy plane is more than or equal to a threshold value h, returns these points again to three-dimensional points, and outputs a cloud of the three-dimensional points to the filtered point cloud DB 142 as a filtered point cloud. FIG. 7 illustrates an example of the filtered three-dimensional point cloud. As illustrated in FIG. 7, noise has been removed.

(Operation of Vertical Pole Extraction Unit 120)

Figure 8:
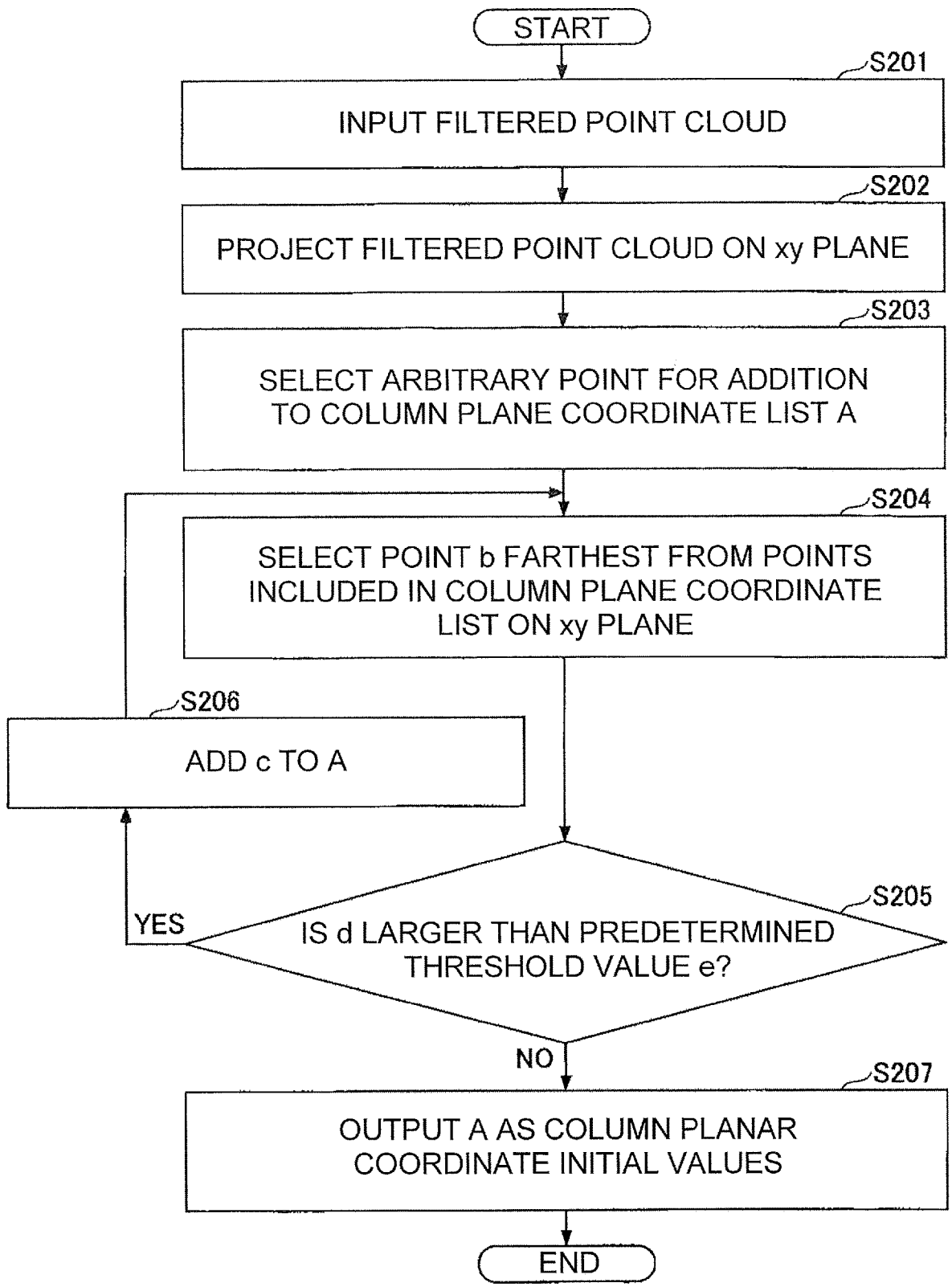
FIG. 8 is a drawing illustrating a process flow of a vertical pole extraction unit.

Next, an operation of the vertical pole extraction unit 120 will be described in line with a process flow of FIG. 8.

<S201>

In S201, the vertical pole extraction unit 120 reads out the filtered point cloud from the filtered point cloud DB 142 as an input. A column planar coordinate initial value is derived by the greedy approximation algorithm for the k-center problem through the following procedure.

<S202>

In S202, the clustering unit 121 of the vertical pole extraction unit 120 projects the filtered point cloud on the xy plane.

<S203>

In S203, the clustering unit 121 selects an arbitrary point projected on the xy plane for addition to a set A which is a column plane coordinate list. An initial value of the set A is null.

<S204>

In S204, the clustering unit 121 selects, as c, a point b (b is a point not included in A) farthest from points included in the column plane coordinate list A on the xy plane. That is, c is obtained in accordance with the following expression.

$$c = \underset{b}{\operatorname{argmax}} \underset{a}{\min} \|b - a\|^2 \text{ subject to } a \in A \quad \text{[Math. 1]}$$

For example, assume that the column plane coordinate list A includes a1, a2, and a3, and there are b1 and b2 as points outside the list. Assuming that a point whose distance from b1 is minimum is a1, a point whose distance from b2 is minimum is a2, and the distance between a1 and b1 is larger than the distance between a2 and b2, b1 is selected as c from the above-described expression.

Note that the distance from the selected c to the set A is assumed as d. In other words, d is a value obtained by the following expression.

$$d = \underset{a}{\min} \|c - a\| \text{ subject to } a \in A \quad \text{[Math. 2]}$$

<S205>

In S205, the vertical pole extraction unit 120 determines whether d is larger than a predetermined threshold value e. In a case where d is larger than the predetermined threshold value e, the process proceeds into S206, while in a case where d is not larger than the predetermined threshold value e, the process proceeds into S207.

<S206>

In S206, the clustering unit 121 adds c to A, and the process returns to S204 to perform processing from S204.

<S207>

In S207, the vertical pole extraction unit 120 outputs A which is a set of the xy plane coordinates to the column planar coordinate initial value DB 143 as column planar coordinate initial values, and the process is terminated.

Figure 9:
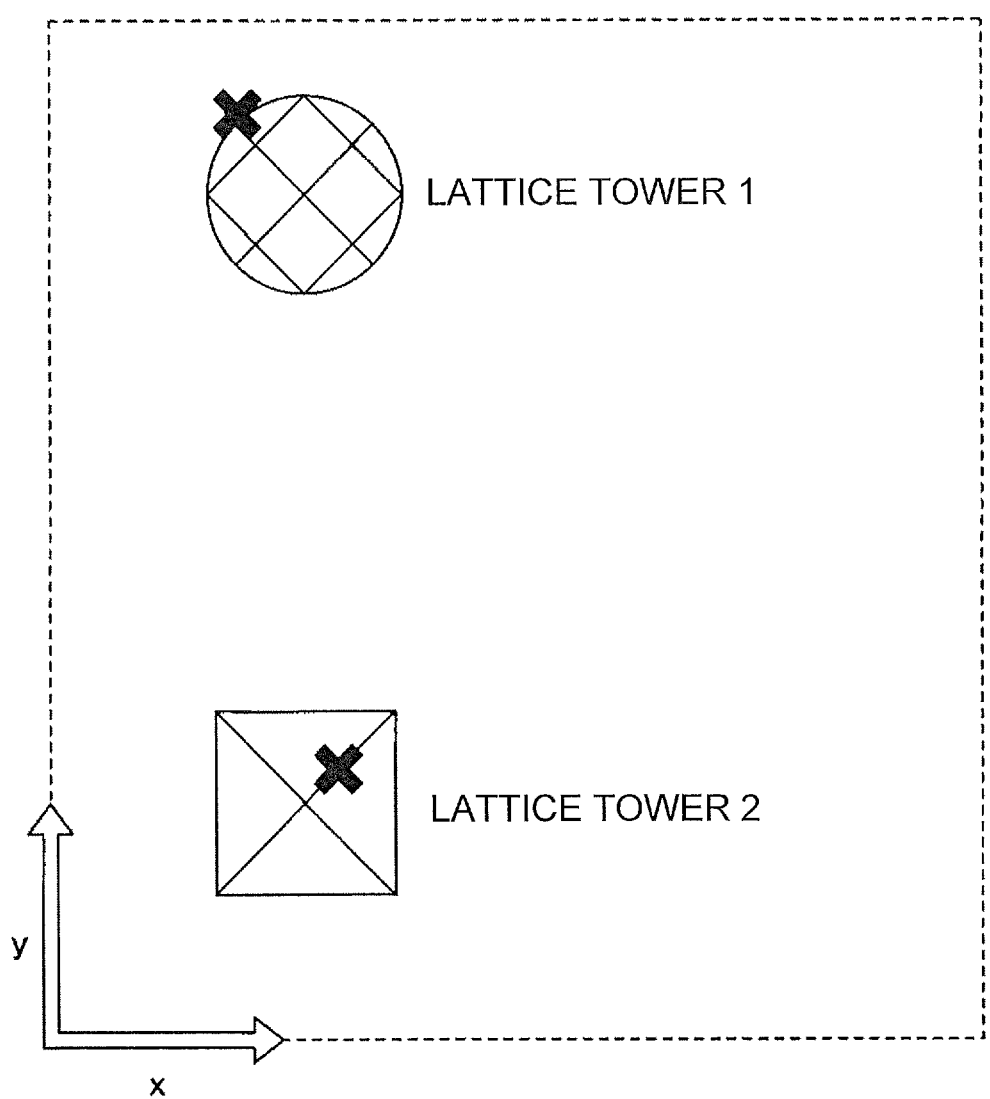
FIG. 9 is a drawing illustrating an example of column planar coordinate initial values.

If e is defined as being about the longer diameter of the cross section of a vertical pole previously detected, A as a result of the above-described processing will be a set including general xy plane coordinates of vertical poles by the number of vertical poles included in the point cloud. FIG. 9 illustrates an example of column planar coordinate initial values.

Note that processing from S202 to S207 corresponds to processing of clustering a filtered point cloud per vertical pole.

(Operation of Column Model Derivation Unit 130)

Figure 10:
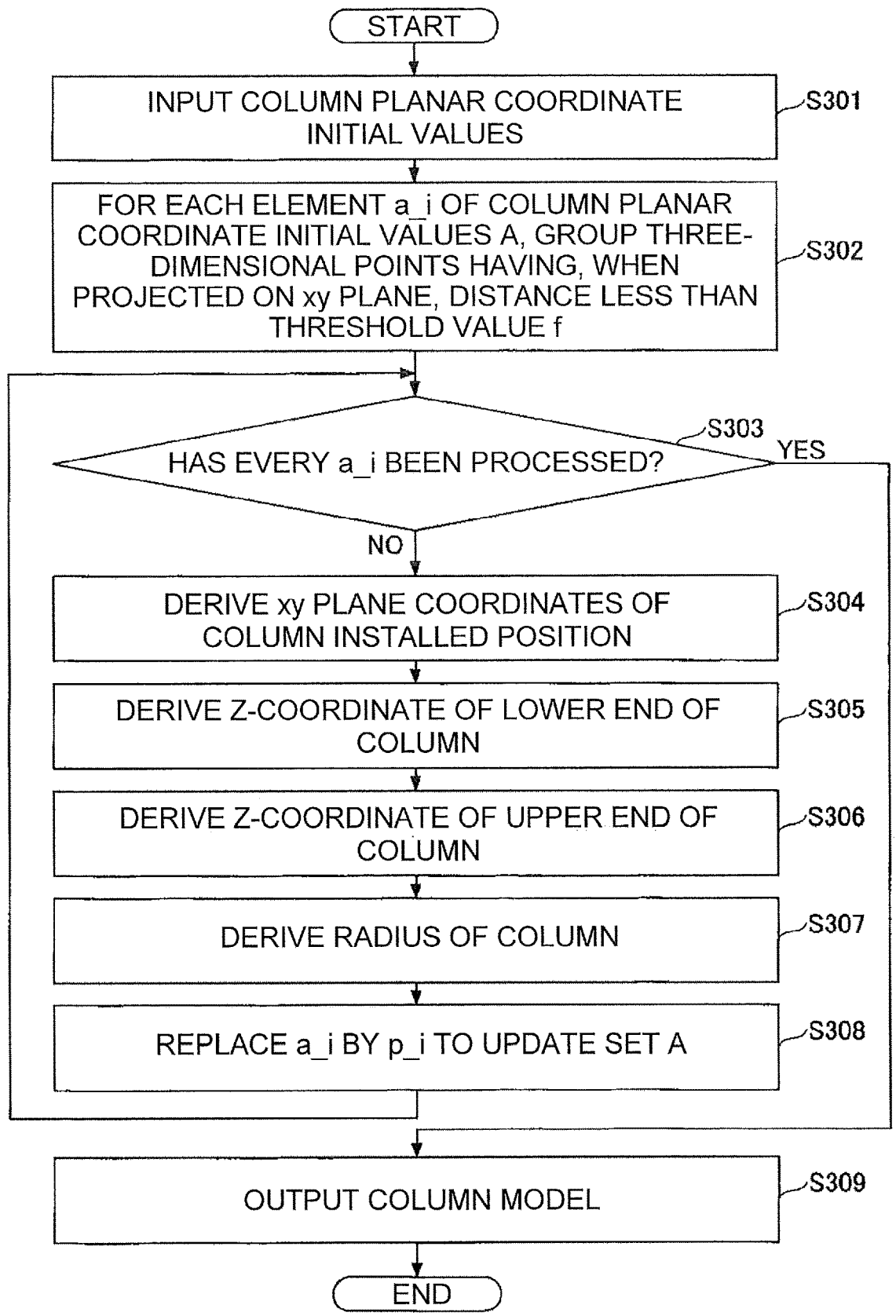
FIG. 10 is a drawing illustrating a process flow of a column model derivation unit.

Next, an operation of the column model derivation unit 130 will be described in line with a process flow of FIG. 10.

<S301>

In S301, the column model derivation unit 130 reads out the filtered point cloud and the list A of column planar coordinate initial values from the filtered point cloud DB 142 and the column planar coordinate initial value DB 143, respectively, as inputs.

<S302>

In S302, the column model derivation unit 130 groups three-dimensional points projected on the xy plane whose distance is less than a threshold value f, for each element a_i of the column planar coordinate initial values in the list A (that is, for each cluster). This group of three-dimensional points is denoted as G_i. If the threshold value f is defined as being about the longer diameter of the cross section of a vertical pole to be detected, points included in each vertical pole can be grouped completely. Note that the clustering unit 112 may execute processing of and before this grouping.

<S303>

Since processing of and subsequent to S304 is executed for each a_i, the column model derivation unit 130 determines in S303 whether every a_i has been processed. If No, unprocessed a_i is selected, and the process proceeds into S304. If Yes, the process proceeds into S309.

<S304>

In S304, the central position estimation unit 131 of the column model derivation unit 130 derives the xy plane coordinates of a column installed position. That is, the central position estimation unit 131 derives a central position of a vertical pole if it is regarded as a column. Assuming a=a_i as an initial value, an optimization problem below is solved to derive a column installed planar coordinate p_i. This optimization problem can be solved by a subgradient method or the like.

$$p\_i = \underset{a}{\operatorname{argmin}} \max_{g \in G\_i} \|g - a\|_{xy}^2 \qquad \text{[Math. 3]}$$

Figure 11:
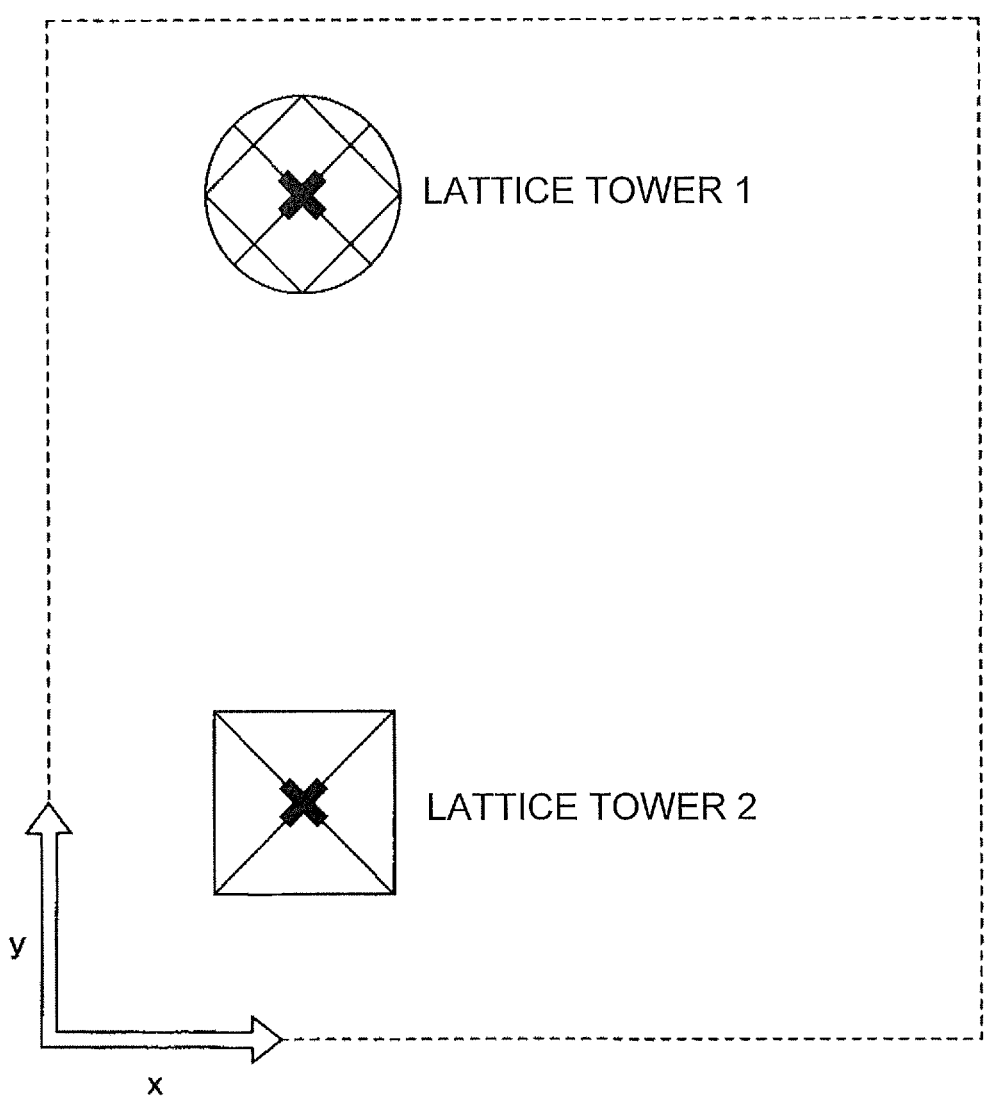
FIG. 11 is a drawing illustrating an example of planar coordinates of column installed positions.

In the above expression, $\|.\|_{xy}$ means deriving an l2 norm of a vector projected on the xy plane. The above expression means repeatedly obtaining a certain coordinate a (coordinate moved using a_i as an initial value) and a coordinate a that minimizes the distance from a point included in G_i whose distance from the coordinate is maximized through an optimization calculation, and defining its convergent value as p_i. FIG. 11 illustrates an example of planar coordinates of column installed positions.

<S305>

In S305, the height estimation unit 133 of the column model derivation unit 130 derives the z-coordinate of the lower end of the column. Specifically, for points belonging to G_i, the column model derivation unit 130 assumes the minimum value of the z-coordinate as z_min_i, and updates z_min_i using predetermined constants z_min_th and z_min_unit through the following processing.

S305-1) A value z_min_rate is obtained by dividing the number of points included in G_i whose z-value (value on the z-coordinate) is larger than z_min_i by the number of points included in G_i.

S305-2) In a case where z_min_rate is larger than z_min_th, the value of z_min_i is updated by z_min_i=z_min_i+z_min_unit, and the process returns to S305-1. Otherwise, processing of S305 is terminated.

<S306>

In S306, the height estimation unit 133 derives the z-coordinate of the upper end of the column. Specifically, the column model derivation unit 130 assumes the maximum value of the z-coordinate as z_max_i for points belonging to G_i, similarly to S305. Through the following processing, z_max_i is updated using predetermined constants z_max_th and z_max_unit.

S306-1) A value z_max_rate is obtained by dividing the number of points included in G_i whose z-value is smaller than z_max_i by the number of points included in G_i.

S306-2) In a case where z_max_rate is larger than z_max_th, the value of z_max_i is updated by z_max_i=z_max_i−z_max_unit, and the process returns to S306-1. Otherwise, processing of S306 is terminated.

As described above, the height estimation unit 133 estimates the height of a vertical pole corresponding to a cluster for each cluster based on points obtained by deleting a predetermined proportion of upper and lower points in the vertical direction from points inversely projected from two-dimensional structure data to three-dimensional structure data. Noise present on the horizontal plane (points that are not mesh structures) is removed by the horizontal plane density filtering unit 110. The height estimation unit 133 is intended to remove noise present on the vertical plane.

<Supplements for S305 and S306>

Processing of S305 and S306 described above is processing for preventing derivation of the lower end and upper end of a pole from being affected by a small amount of noise, in which z_min_th and z_max_th are set at values close to 1.0 such as 0.99, and z unit is set at a value sufficiently smaller than the height scale of the vertical pole. It may be set at a value of about 1/1000 of an assumed height of the vertical pole, for example.

<S307>

In S307, the radius estimation unit 132 of the column model derivation unit 130 derives the radius of a column (a vertical pole regarded as a column). Specifically, the radius estimation unit 132 assumes r_i=r_init as an initial value, and updates a column radius r_i using predetermined r_th and r_unit through the following processing. Note that r_init may be set at a value sufficiently larger than the radius of the column.

S307-1) A value r rate is obtained by dividing the number of points belonging to G_i present at a distance less than r_i from p_i when projected on the xy plane by the number of points belonging to G_i.

S3072) In a case where r rate is larger than r_th, r_i is updated by r_i=r_i−r_unit, and the process returns to S307-1. Otherwise, the process is terminated.

<Supplements for S307>

Processing of S307 is processing for preventing derivation of the radius of the circle from being affected by a small amount of noise, in which r_th is set at a value close to 1.0 such as 0.99, and r_unit is set at a value sufficiently smaller than the scale of the diameter of the cross section of the vertical pole. It may be set at a value of about 1/1000 of an assumed longer diameter of the cross section of the vertical pole, for example.

<S308>

In S308, the column model derivation unit 130 replaces a_i by p_i to update the set A. Furthermore, a set of points included in G_i whose height is more than or equal to z_min_i and less than z_max_i and distance from pi when projected on the xy plane is less than r_i is updated as G_i. For a_i targeted for processing, values of z_min_th, z_max_th, z_min_unit, z_max_unit, r_th, and r_unit may be set again according to necessity, and processing from S304 to S308 may be carried out repeatedly.

After S308, the process returns to S303.

<S309>

Figure 12:
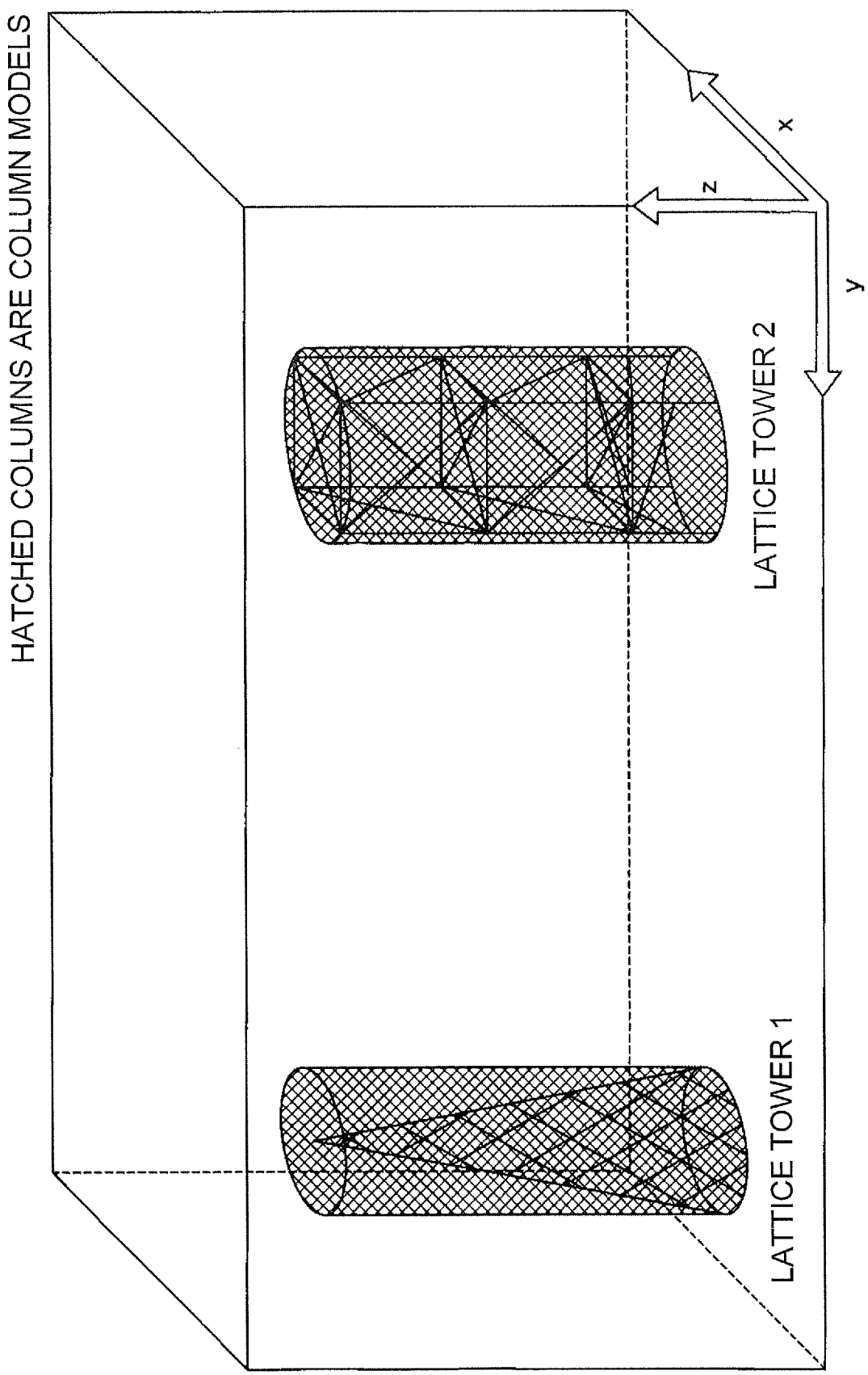
FIG. 12 is a drawing illustrating an example of column models.

In S309, the column model derivation unit 130 outputs a column model to the column model DB 144. The column model is a group of the following values, and is output by the same number as the number of elements of A. FIG. 12 illustrates an example of output column models.

Column installed position: three-dimensional coordinates whose xy coordinate is p_i, and z-coordinate is z_min_i Column radius: r_i Column height: z_max_i−z_min_i (Variation)

Figure 13:
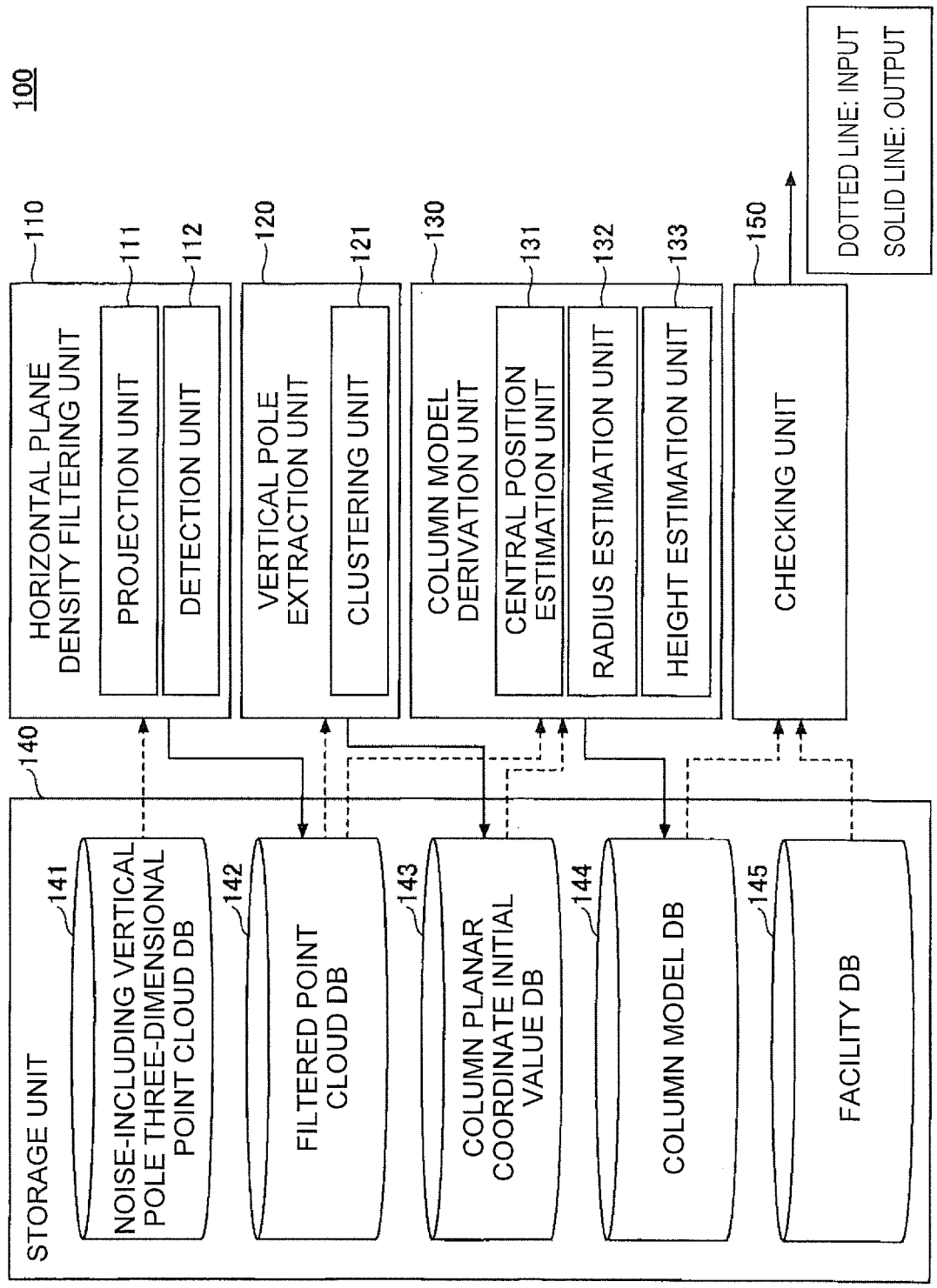
FIG. 13 is a drawing illustrating a configuration example of a vertical pole modeling device according to a variation.

FIG. 13 is a configuration diagram of the vertical pole modeling device 100 according to a variation. As illustrated in FIG. 13, the vertical pole modeling device 100 according to the variation has a configuration in which a facility DB 145 and a checking unit 150 have been added to the vertical pole modeling device 100 illustrated in FIG. 1.

The facility DB 145 stores the radius and height of a vertical pole and the type of the vertical pole in association. The "type" may be the type representing the shape of a lattice tower such as a quadrangle lattice tower or triangle lattice tower, or may be one that represents the intended use such as a power transmission lattice tower or radio tower, or may be a type other than these.

The checking unit 150 reads out a radius and height from the column model DB 144 for checking against radii and heights stored in the facility DB 145, and reads out and outputs the type corresponding to a radius and height that agree to the radius and height of the column model. Together with the type, the position of the relevant column model may be output.

Note that the term "agree" does not require complete agreement, but it may be regarded as agreement if a difference for each of the radius and height falls within the range of predetermined threshold values.

Effects of Embodiment

According to the vertical pole modeling device 100 described above, a column model can be fitted even to a pole not having a shape easily expressed as a geometric model, a pole for which a geometric model has not been generated in advance, and a pole whose surface shape has not been obtained correctly because of significant measurement noise, provided that the pole is built in the vertical direction.

A pole of a common mesh structure facility built vertically can be expressed by the vertical pole modeling device 100 with a small amount of information including "coordinates of an installed position", "radius of cross section", and "height" irrespective of the shape of the pole and with no previous knowledge about the shape of the pole.

Expressing a target object with a small amount of information is effective from the perspective of management of a structure, and in the case of a pole, for example, an installation status of a facility can be managed by the position and size of the pole. For such an application, it is not necessarily required to provide a geometric model strictly by a shape similar to that of the target object.

Furthermore, in a case of targeting at such a structure standardized in size and shape, a strict shape and size can also be identified by checking the aforementioned "radius of cross section" and "height" against the standard.

In addition, if the position at which a pole is located is found in advance by the vertical pole modeling device 100, a detailed geometric model of a standardized structure can be fitted in later processing with the technique of Non-Patent Literature 1. In general, fitting a detailed geometric model of a structure having a complicated shape to a three-dimensional point cloud is significantly affected by noise, and is thus difficult to carry out correctly. In addition, if fitting is performed without a model candidate position, a calculation requires much time because of a vast search space. On the other hand, it is known that if the position at which a pole is installed is found in advance by the vertical pole modeling device 100, model fitting can be achieved correctly by carrying out geometric model fitting only around the position, so that the geometric model can be fitted at high speed and correctly.

Conclusion of Embodiment

The present specification at least describes a mesh structure facility detection device, a mesh structure facility detection method, and a program of the following items.

(Item 1)

A mesh structure facility detection device that detects data corresponding to a mesh structure facility from three-dimensional structure data representing a space including an outer shape of an object, including:
  a projection unit that projects the three-dimensional structure data in a predetermined direction to obtain two-dimensional structure data; and
  a detection unit that detects a point included in a region in which the two-dimensional structure data has a density of more than or equal to a predetermined threshold value as a point corresponding to the mesh structure facility.

(Item 2)

The mesh structure facility detection device according to Item 1, further including:
  a clustering unit that, based on a point-to-point distance between a plurality of points detected by the detection unit and a predetermined size of the mesh structure facility, clusters the detected points for each mesh structure facility present in the space.

(Item 3)

The mesh structure facility detection device according to Item 2, further including:
  a central position estimation unit that obtains a center for each of clusters obtained by the clustering unit, and outputs the obtained center as a position of a mesh structure facility corresponding to the cluster.

(Item 4)

The mesh structure facility detection device according to Item 3, wherein
  the projection unit performs projection on a horizontal plane, the mesh structure facility detection device further including:
  a height estimation unit that, for each of the clusters, estimates a height of the mesh structure facility corresponding to the cluster based on points obtained by deleting a predetermined proportion of upper and lower points in a vertical direction from points inversely projected to the three-dimensional structure data.

(Item 5)

The mesh structure facility detection device according to Item 4, further including:
  a radius estimation unit that, for each of the clusters, based on a proportion of the number of points present at less than a predetermined distance from the center of the cluster to the number of points belonging to the cluster, estimates a radius of the mesh structure facility corresponding to the cluster.

(Item 6)

The mesh structure facility detection device according to Item 5, further including:
  a checking unit that checks the radius and height of the mesh structure facility against radii and heights registered in a facility database, acquires a type of a relevant mesh structure facility from the facility database, and outputs the type and a central position of the mesh structure facility.

(Item 7)

A mesh structure facility detection method executed by a mesh structure facility detection device that detects data corresponding to a mesh structure facility from three-dimensional structure data representing a space including an outer shape of an object, including:
  a projection step of projecting the three-dimensional structure data in a predetermined direction to obtain two-dimensional structure data; and a detection step of detecting a point included in a region in which the two-dimensional structure data has a density of more than or equal to a predetermined threshold value as a point corresponding to the mesh structure facility.

(Item 8)

A program for causing a computer to function as each unit in the mesh structure facility detection device according to any one of Items 1 to 6.

The present embodiment has been described above, but the present invention is not limited to such a specific embodiment, and various modifications and changes can be made within the scope of the present invention as described in the claims.

REFERENCE SIGNS LIST

100 Vertical pole modeling device
110 Horizontal plane density filtering unit
120 Vertical pole extraction unit
130 Column model derivation unit
140 Storage unit
111 Projection unit
112 Detection unit
121 Clustering unit
131 Central position estimation unit
132 Radius estimation unit
133 Height estimation unit
141 Noise-including vertical pole three-dimensional point cloud DB
142 Filtered point cloud DB
143 Column planar coordinate initial value DB
144 Column model DB
145 Facility DB
150 Checking unit
1000 Drive device
1001 Recording medium
1002 Auxiliary storage device
1003 Memory device
1004 CPU
1005 Interface device
1006 Display device
1007 Input device

The invention claimed is:

1. A mesh structure facility detection device that detects data corresponding to a mesh structure facility from three-dimensional structure data representing a space including an outer shape of an object, the mesh structure facility detection device comprising:
   a processor; and
   a memory that includes instructions, which when executed, cause the processor to execute:
   projecting the three-dimensional structure data in a predetermined direction to obtain two-dimensional structure data; and
   detecting a point included in a region in which the two-dimensional structure data has a density of more than or equal to a predetermined threshold value as a point corresponding to the mesh structure facility.

2. The mesh structure facility detection device according to claim 1, wherein the processor is further caused to execute:
   based on a point-to-point distance between a plurality of points detected and a predetermined size of the mesh structure facility, clustering the detected points for each mesh structure facility present in the space.

3. The mesh structure facility detection device according to claim 2, wherein the processor is further caused to execute:
   obtaining a center for each obtained cluster, and outputting the obtained center as a position of a mesh structure facility corresponding to the cluster.

4. The mesh structure facility detection device according to claim 3, wherein the processor is further caused to execute:
   performing projection on a horizontal plane; and
   for each cluster, estimating a height of the mesh structure facility corresponding to the cluster based on points obtained by deleting a predetermined proportion of upper and lower points in a vertical direction from points inversely projected to the three-dimensional structure data.

5. The mesh structure facility detection device according to claim 4, wherein the processor is further caused to execute:
   for each of the clusters, based on a proportion of the number of points present at less than a predetermined distance from the center of the cluster to the number of points belonging to the cluster, estimating a radius of the mesh structure facility corresponding to the cluster.

6. The mesh structure facility detection device according to claim 5, wherein the processor is further caused to execute:
   checking the radius and height of the mesh structure facility against radii and heights registered in a facility database, acquiring a type of a relevant mesh structure facility from the facility database, and outputting the type and a central position of the mesh structure facility.

7. A non-transitory computer readable medium storing a program for causing a computer to function as the mesh structure facility detection device according to claim 1.

8. A mesh structure facility detection method executed by a mesh structure facility detection device that detects data corresponding to a mesh structure facility from three-dimensional structure data representing a space including an outer shape of an object, comprising:
   projecting the three-dimensional structure data in a predetermined direction to obtain two-dimensional structure data; and
   detecting a point included in a region in which the two-dimensional structure data has a density of more than or equal to a predetermined threshold value as a point corresponding to the mesh structure facility.

* * * * *